(12) United States Patent
Carter et al.

(10) Patent No.: US 6,573,895 B1
(45) Date of Patent: Jun. 3, 2003

(54) CLUSTERED BACKFACE CULLING

(75) Inventors: Michael B. Carter, Ames, IA (US); Andreas Hugo Walter Johannsen, Redmond, WA (US)

(73) Assignee: Unigraphics Solutions Inc., Cypress, CA (US)

( * ) Notice: Subject to any disclaimer, the term of this patent is extended or adjusted under 35 U.S.C. 154(b) by 0 days.

(21) Appl. No.: 09/551,612

(22) Filed: Apr. 17, 2000

Related U.S. Application Data

(60) Provisional application No. 60/129,649, filed on Apr. 16, 1999.

(51) Int. Cl.[7] .................................................. G06T 11/20
(52) U.S. Cl. ........................................ 345/441; 345/423
(58) Field of Search ................................. 345/441, 419, 345/423, 427, 850

(56) References Cited

U.S. PATENT DOCUMENTS

| | | | | |
|---|---|---|---|---|
| 5,861,885 A | * | 1/1999 | Strasnick et al. | 345/850 |
| 6,061,065 A | * | 5/2000 | Nagasawa | 345/427 |
| 6,307,555 B1 | * | 10/2001 | Lee | 345/423 |
| 6,201,542 B1 | * | 3/2002 | Arai et al. | 345/419 |

* cited by examiner

*Primary Examiner*—Cliff N. Vo
*Assistant Examiner*—Huedung X. Cao
(74) *Attorney, Agent, or Firm*—Pennie & Edmonds LLP

(57) ABSTRACT

A backface culling technique for clusters of polygons, as well as a method for generating efficient clusters from a set of triangle strips. The cluster backface test is directly derived from the traditional single-polygon test, and has about the same complexity. Memory requirements are 40 bytes per test. The cluster backface tests may be arranged hierarchically, with frontface tests added for symmetry. Experiments show graphics performance improvements of up to 50% in terms of number of effective polygons rendered per second.

53 Claims, 7 Drawing Sheets

(4 of 7 Drawing Sheet(s) Filed in Color)

CLUSTERED BACKFACE CULLING

RELATED APPLICATIONS

The present application claims priority to U.S. Provisional Application No. 60/129,649, filed Apr. 16, 1999.

TECHNICAL FIELD

The present invention is related in general to three-dimensional graphics imaging, and, in particular, to a method and system for culling (removing) polygons that face in a direction away from a viewpoint (backface) when an image is rendered on a graphics device.

BACKGROUND

Shaded rendering of polygonal models at interactive frame rates has been a core research area of Computer Graphics since its inception. Contemporary workstations and personal computers with hardware z-buffer graphics accelerators are capable of rendering several million triangles a second. However, advances in graphics accelerators have constantly been outpaced by the demands of applications; models with several tens or hundreds of million polygons are routinely encountered, for example, in the design and evaluation of mechanical systems such as cars and airplanes. Approaches to the large model rendering problem concentrate on identifying a minimal subset of polygons that represents the given model, and rendering only this subset. One long-used technique is backface culling, whereby only the polygons facing in the direction of the viewpoint are rendered.

The rendering pipeline of common graphics accelerators consists, roughly speaking, of two stages: a transform stage that transforms 3D vertex and normal data by a 4×4 matrix to view coordinates, and a rasterizer stage that produces shaded pixels and places them into a frame buffer. Also, polygonal data typically resides in RAM and has to be transferred to the graphics accelerator by some means, e.g. the system bus.

Considering the transfer/transform/rasterizer pipeline, traditional hardware-based backface culling operates after the transform stage and before the rasterizer stage. Pipeline throughput is limited by its slowest stage; if this happens to be the rasterizer, then backface culling may improve overall graphics performance by up to a factor of two, as half of all polygons face away from the viewer, on average. However, if the pipeline bottleneck is presented by the transfer or transform stage, as is not uncommon for contemporary graphics accelerators, then backface culling may have no effect on performance, or even be detrimental. In these cases it is desirable to perform backface culling on the host CPU, before sending data to the graphics accelerator. The traditional single-polygon backface culling test, however, takes time linear in the number of polygons, and proves impractical for this purpose, even if the test is accelerated, as described in Zhang et al., *Fast Backface Culling Using Normal Masks*, ACM Symposium of Interactive 3D Graphics, Providence, 1997.

In order to perform backface culling in sub-linear time, it is necessary to have a single test decide upon the orientation of a whole cluster of polygons. Such a test has to be conservative and identify clusters that are guaranteed to only contain back facing polygons; any cluster for which this fact cannot be established, or that contains at least one front facing polygon, must be rendered. Thus, culling effectiveness for clusters of polygons is smaller than for single polygons, and polygons that are actually back facing may erroneously be sent to the graphics accelerator (but will consequently be culled by the accelerator).

For simple models, clusters of back facing polygons may be identified by hand, as described in J. Foley et al., *Computer Graphics—Principles and Practice*, Second Ed., Addison Wesley, 1990. Consider, for example, a cube centered at the origin, with faces perpendicular to the coordinate axes. If the eye point of a perspective view is located in the positive octant, then the three faces with negative normal coordinates are all back facing. This relationship can easily be established for each of the eight octants, and the result stored in a lookup table. At rendering time, this table is indexed with the octant in which the eye point is located.

Manually constructed tables are clearly impractical for all but very simple and/or symmetric polyhedra. Aspect graphs, as described in Z. Gugus et al, *Efficiently Computing and Representing Aspect Graphs of Polyhedral Objects*, IEEE Trans. on PAMI, vol. 13, pp. 542–51, 1991, subdivide space into cells that correspond to eye point equivalence classes with respect to face visibility. However, for a polyhedron with N faces, there are worst case $O(N^9)$ cells, which makes such a general indexing technique impractical.

For convex polyhedra, Tanimoto, *A Graph-Theoretic Real-Time Visible Surface Editing Technique*, SIGGRAPH 7, pp 223–228, suggests an algorithm that incrementally updates the object space outline separating back facing and front facing polygons, using frame to frame coherency. For general polyhedra, Kumar et al., *Hierarchical Back-Face Computation*, Eurographics Workshop on Rendering, 1996, proposes a cluster culling test based on the explicit construction of an object space cell that contains all eye points for which the cluster is back facing. Such a construction is awkward, and the ensuing space subdivision consumes considerable time and memory.

SUMMARY OF THE INVENTION

The present invention is directed to a backface culling technique which operates on two-dimensional surfaces, or polygons, such as triangles, quadrilaterals, and the like, or groups of a these arranged as tristrips, trifans, quadstrips, or meshes. In the present invention, collections of these two-dimensional polygons are arranged into clusters. Each cluster is bounded by up to eight bounding planes, one for each octant of the 3D Cartesian coordinate space within which an eye point may lie. Portions of a cluster on one side of each bounding plane may then be culled.

In one aspect of the invention, two existing clusters are joined together to form a single cluster based on whether a backface culling probability of the single cluster exceeds a predetermined value related to the weighted backface culling probabilities of the two individual clusters and a value related to the incremental cost of rendering an additional cluster.

In yet another aspect of the invention, the center of each cluster is shifted to provide it with a local coordinate system and a new eye point to increase the accuracy of the backface culling process.

In yet another aspect of the invention, the memory requirements for the present backface culling test are relatively low, taking about 40 bytes per test, assuming single precision floating point.

In another aspect of the invention, the backface tests are arranged hierarchically, and frontface tests are added for symmetry, the frontface tests consuming only an additional 4 bytes per test.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

These and other objects, features and advantages of the present invention are more readily understood from the following detailed description of the preferred embodiments, the claims and with reference to the appended drawings, in which:

DETAILED DESCRIPTION OF THE PREFERRED EMBODIMENTS

The Cluster Backface Test

Figure 1:
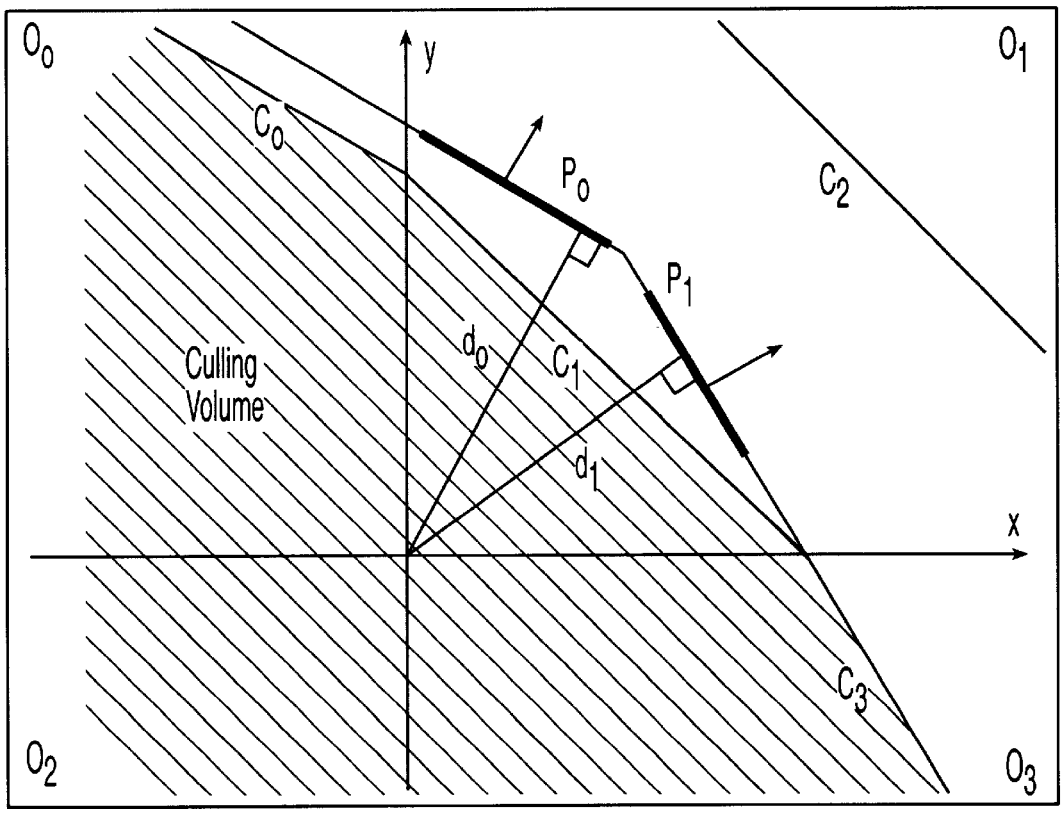
FIG. 1 illustrates an example of a 2-D backface culling process in accordance with the present invention.

In the present disclosure, reference is made to polygonal surfaces, which comprise groups of planar polygons. Thus, the present invention applies to planar surfaces of any type such as triangles, quadrilaterals, and the like, or groups of these arranged as tristrips, trifans, quadstrips and meshes, among others.

The cluster backface test of the present invention is based on the conventional backface culling test applied to a single polygon. To understand the conventional backface culling test, we assume that an eye point of a perspective view be given as $e=[e^x, e^y, e^z]^T$ in world coordinates. Then, any plane polygon with normal n and one vertex point p, also in world coordinates, faces away from e iff $n \cdot (e-p) \leq 0$. This is the conventional backface culling test, and its operation can be illustrated with a simple example: Assume that the eye point is on the x-axis, or $e=(1, 0, 0)^T$ and the polygon is the positive–positive quadrant of the y-z plane containing vertex $p=(0,0,0)^T$ with normal vector $n=(-1, 0, 0)$. In such case, $n \cdot (e-p)=(-1, 0, 0) \cdot \{(1, 0, 0)-(0,0,0)\}=-1 \leq 0$.

Now, consider a cluster of N polygons, the $i^{th}$ polygon having normal $n_i$ and vertex point $p_i$. All polygons face away from e iff, $$\text{for } 1 \leq i \leq N, \; n_i \cdot (e-p_i) \leq 0. \tag{1}$$

Restated, Eq. (1) simply says that for a given viewpoint, all the polygons in a cluster are backface culled, if and only if each individually satisfies the traditional backface culling test. Therefore, to realize backface culling in sub-linear time, one preferably culls several such polygons at one time. In such case, in a preferred embodiment, a test using precomputed quantities depending on the $n_i$ and $p_i$, but not e, is developed. For this, the following simple inequalities are established for the derivation of the cluster backface culling test:

$$\text{Max}_i(a_i-b_i) \leq \text{Max}_i(a_i)-\text{Min}_i(b_i) \tag{2}$$

$$\text{Max}_i(a_i+b_i) \leq \text{Max}_i(a_i)+\text{Max}_i(b_i) \tag{3}$$

$$\text{Max}_i(a_i k)=\text{Max}_i(a_i)k; \; k \geq 0 \tag{4a}$$

$$\text{Max}_i(a_i k)=\text{Min}_i(a_i)k; \; k<0 \tag{4b}$$

As a first step, the N inequalities of (1) are equivalent to the single inequality $$\text{Max}_i[n_i \cdot (e-p_i)] \leq 0. \tag{5}$$

The left hand side of (5) still contains e, but an upper bound may be found as follows: Distributing the dot product and applying (2), $$\text{Max}_i[n_i \cdot (e-p_i)] \leq \text{Max}_i(n_i \cdot e)-\text{Min}_i(n_i \cdot p_i), \tag{6}$$

which is a step in the right direction, as the minimum plane offset $d=\text{Min}_i(n_i \cdot p_i)$, which is the second term in Eq. (2), may be precomputed. Substituting d and expanding the dot product, Eq. (6) becomes $$\leq \text{Max}_i(n_i^x e^x+n_i^y e^y+n_i^z e^z)-d, \tag{6a}$$

and applying the inequality of Eq. (3), $$\leq \text{Max}_i(n_i^x e^x)+\text{Max}_i(n_i^y e^y)+\text{Max}_i(n_i^z e^z)-d, \tag{6b}$$

Now, If e lies in the positive octant, with all three coordinates $e^x, e^y, e^z$ positive, then (4a) applies to all $\text{Max}^i(\;)$ terms, giving:

$$\leq \text{Max}_i(n_i^x)e^x+\text{Max}_i(n_i^y)e^y+\text{Max}_i(n_i^z)e^z-d, \tag{7}$$

For any negative coordinate of e, the corresponding $\text{Max}_i(\;)$ term changes to a $\text{Min}_i(\;)$ term according to (4b). This may be expressed in vector notation by defining, component-wise for $c \in \{x, y, z\}$, $$\text{Comp}_c(a, b)^c \equiv \begin{cases} a^c & \text{for } e^c \leq 0 \\ b^c & \text{for } e^c > 0 \end{cases}.$$

Then, expression (7) can be written as $$\leq \text{Comp}_e(N, M) \cdot e-d, \tag{7a}$$

with $$N=[\text{Min}_i(n_i^x), \text{Min}_i(n_i^y), \text{Min}_i(n_i^z)]^T \tag{7b}$$

$$M=[\text{Max}_i(n_i^x), \text{Max}_i(n_i^y), \text{Max}_i(n_i^z)]^T \tag{7c}$$

Thus, N comprises the smallest valued x-, y- and z-components from among the $n_i$, M comprises the largest valued x-, y- and z-components from among the $n_i$ corresponding to the polygons in the cluster, and d is the minimum plane offset, as discussed above.

Considering that (7) is an upper bound for the left hand side of (5), a backface culling test for clusters of polygons is $$\text{Comp}_e(N,M) \cdot e-d \leq 0 \tag{8}$$

with pre-computed quantities N, M and d as defined above. These quantities, two 3-vectors and a scalar, consume 28 bytes of storage space in single precision.

For any particular eye point e, the left hand side of (8) merely presents a plane equation with normal $\text{Comp}_e(N,M)$ and offset d. Therefore, the test may be interpreted as defining up to eight culling planes, one associated with each octant within which an eye point may lie. It should be noted, however, that it is possible that less than eight culling planes may be used, such as when an entire octant is to be culled. All culling planes $C_i$ meet at coordinate axes, and therefore along octant boundary planes. Consider, for example, the four octants with positive x-coordinate. The four corresponding culling planes have the same normal vector x-coordinate $M_x$, so they all intersect the x-axis at $$x_0 = \frac{d}{M_x}.$$

Thus the culling planes define a culling volume: if the eye point lies any where in the culling volume, all polygons in the cluster are backfacing and may be culled. However, the culling volume itself does not depend on the eye point.

The efficacy of the present cluster culling test may be demonstrated using a simple two-dimensional example with reference to FIG. 1. For the two-dimensional example, the two polygons $P_0$ and $P_1$ of FIG. 1, are rotated 30° and 60° versus the x-axis, respectively. Polygon normals are $$n_0 = \begin{bmatrix} 0.5 \\ \sqrt{3}/2 \end{bmatrix} \text{ and } n_1 = \begin{bmatrix} \sqrt{3}/2 \\ 0.5 \end{bmatrix}, \text{ yielding}$$

$$N = \begin{bmatrix} 0.5 \\ 0.5 \end{bmatrix} \text{ and } M = \begin{bmatrix} \sqrt{3}/2 \\ \sqrt{3}/2 \end{bmatrix}.$$

The minimum plane offset is the one for $P_1$, $d_1=n_1 \cdot p_1$, which results in culling planes $C_i$ for octants $O_i$, as indicated in FIG. 1. With regard to FIG. 1, it is noted that $C_2$ lies outside of $O_2$, so the cluster $\{P_0, P_1\}$ will be culled for all eye points within $O_2$. Generally, the culling planes $C_2$ and $C_3$ must share a y-axis intersection. Likewise, culling planes $C_2$ and $C_0$ must share an x-axis intersection. In the example of FIG. 1, both intersections are positive, so $C_2$ lies outside of $O_2$, and all of $O_2$ lies within the culling volume.

A special case is when one considers N coplanar polygons. In such a case, all plane normals and offsets are the same:

for $1 \leq i \leq N$, $n_i = n$, $n_i \cdot p_i = t$.

Consequently, in this case, the pre-computed data is $N=M=n$, $d=t$, and all culling planes $C_i$ coincide with the polygon plane. Therefore, the cluster backface test is sharp for coplanar polygons.

A second special case occurs for arbitrary clusters, when the eye point is located at the coordinate system origin. Substituting $e=0$ into (8), the cluster backface test reduces to:

$$-\text{Min}_i(n_i \cdot p_i) \leq 0. \tag{9}$$

This is exactly the case when there are only positive polygon plane offsets. Therefore, the cluster backface test is also sharp for $e=[0,0,0]^T$.

Merging of Clusters

When two clusters, cluster A and cluster B having offset d and M and N vectors given by $d_A$, $M_A$, $N_A$, and $d_B$, $M_B$, $N_B$ respectively, are merged to form cluster C, their pre-computed data is calculated as follows:

$$N_C=[\text{Min}(N_A^x, N_B^x), \text{Min}(N_A^y, N_B^y), \text{Min}(N_A^z, N_B^z)] \tag{10a}$$

$$M_C=[\text{Max}(M_A^x, M_B^x), \text{Max}(M_A^y, M_B^y), \text{Max}(M_A^z, M_B^z)] \tag{10b}$$

$$d_C=\text{Min}(d_A, d_B) \tag{10c}$$

Thus, one advantageously does not need to recalculate these parameters for the combined cluster C based on the individual coordinates of the original normal vectors for each polygon within each of the two clusters A and B.

Transformation of Coordinates for Testing

With the cluster backface test of Eq. (8), d becomes arbitrarily negative as the $p_i$ move away from the world coordinate origin in a direction opposite that of the normals $n_i$. In such case, the cluster backface test may never be satisfied for reasonable eye points e. Therefore, the cluster backface test may be more effective if the geometry being culled lies closer to the origin.

In order to combat the effect of arbitrarily positioned $p_i$, a local coordinate system may be chosen for each cluster backface test, tailored to the polygons in the cluster. This involves transforming polygon data to the local system during preprocessing, in order to compute parameters d, N and M. Then, at rendering time in the graphics processor, the eye point needs to be transformed into local coordinates before performing the cluster culling test. To minimize eye point transformation overhead and memory requirements, only origin translations are considered here, i.e. the local test coordinate system is world coordinate axis-aligned, but has cluster local origin b. In general, it may be difficult to determine the optimal value for cluster local origin b. However, candidate values for b, such as the eight corners of the cluster's bounding box, or the cluster's centroid, may be used. A method for evaluating the goodness of a particular value of cluster local origin b can be elicited from the criterion associated with calculating near-field and far-field culling probabilities.

An arbitrary point x in world coordinates is transformed into test coordinates by x'=x-b. Thus, a simple linear translation, rather than a complete affine transformation rotating the coordinate system, is used, using the offset of cluster local origin b. Of the precomputed data, only d is affected, $d=\text{Min}_i [n_i \cdot (p_i-b)]$, and the eye point to be used in Eq. (8) is e'=e-b. The cluster backface test variables then become d, N, M and b, together consuming 40 bytes in single precision (28 bytes for d, N and M and 12 additional bytes for b).

If one wishes to merge two polygon clusters' precomputed data, this can be done as discussed above, only that a new test coordinate origin $b_*$ needs to be chosen, and $d_*$ must be recomputed as:

$$d_*=\text{Min}[\text{Min}_i(n_{a,i} \cdot (p_{a,i}-b_*)), \text{Min}_i(n_{b,i} \cdot (p_{b,i}-b_*))] \tag{11}$$

Thus, re-expanding with bias vector $b_*$ may require one to explicitly iterate over all the polygons to compute the merged $d_*$. This is because the lossy nature of the Max and Min operators precludes one from simply shifting the expansion to a new center vector $b_*$.

Cluster Generation

Given a backface culling test for clusters of polygons, an algorithm is needed to efficiently form these clusters from the original geometry. It should be noted, however, that the original geometry may have been expressed in terms of polygonal surfaces, such as tristrips, trifans, quadstrips or other possibly 3-dimensional groupings of planar polygons. Without loss of generality, the following discussion assumes that original geometry is in the form of tristrips of trifans, which are suitable for most graphics accelerators. However, the present invention applies in the general case to individual polygons, as well. In order to drive any algorithm, there has to be a measure of cluster goodness. In the present context, the measure of goodness preferably is related to the average probability that a cluster will be culled.

Figure 2:
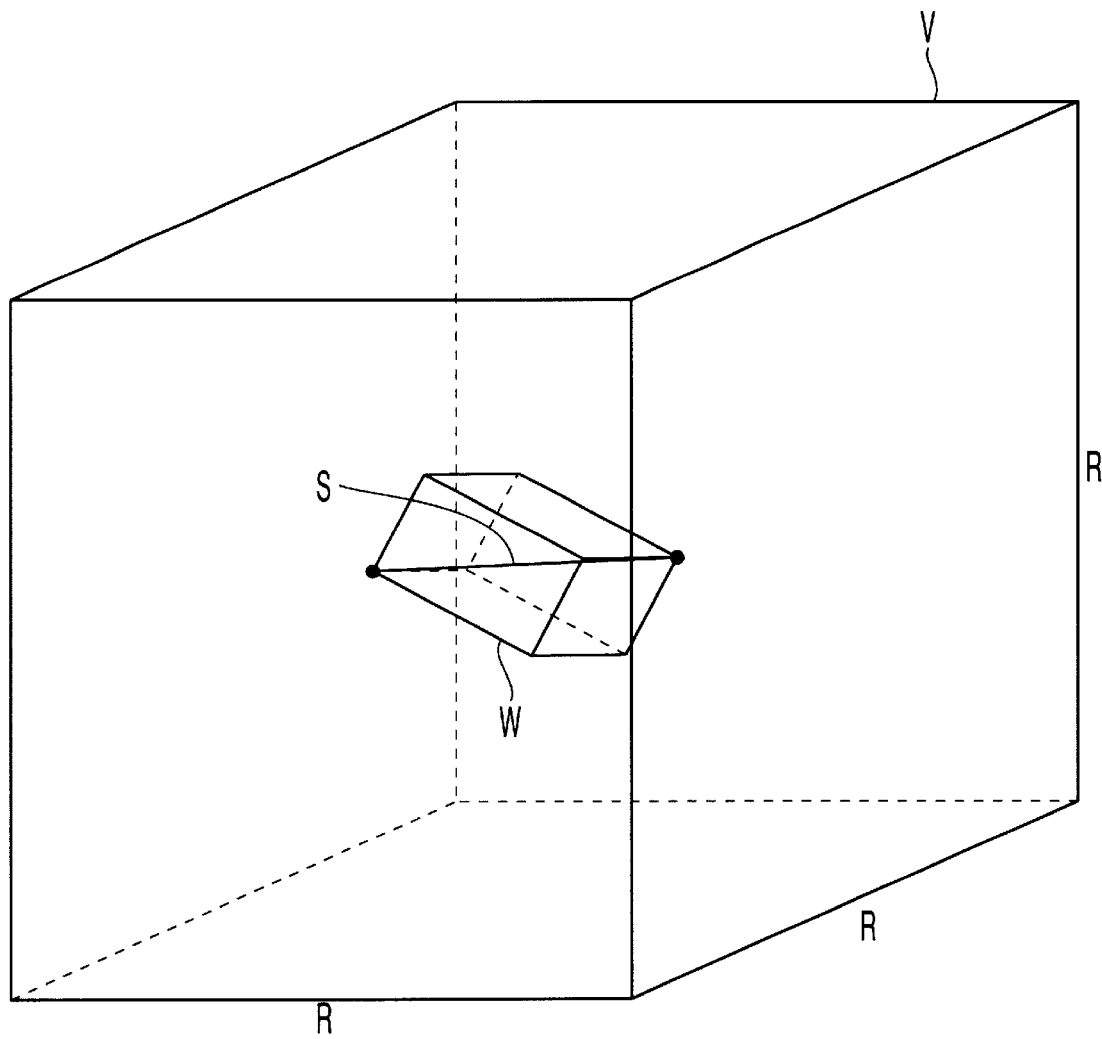
FIG. 2 pictorially illustrates the backface culling probability of a cluster in accordance with the present invention.

Strictly speaking, the eye point e may view a cluster of tristrips from any where in 3D space. In most applications, however, eye points will tend to be located close to the geometry—within a few times the size of the object's bounding box. An axis-aligned box V of size R×R×R centered about the centroid of the object defines a volume of space within which eye points for viewing the graphical object are assumed to lie ("eye point volume"). While the axis-aligned box V is a cube with sides of length R, it should be noted that eye point volumes of other shapes, such as a sphere of diameter R centered about the object's centroid, may be used instead. Here, it is assumed that R=rS, where S is the length of the main diagonal of the object's bounding box W (which usually is not a cube) and r is a multiplier. This relationship is pictorially illustrated in FIG. 2. The value of r can be selected by the implementer of the algorithm but, for obvious reasons, r should be greater than 1 and in a preferred embodiment, r is at least 5. In a most preferred embodiment r=10 and so the axis-aligned box V has dimensions on the order of ten times that of the main diagonal of box W (as would a sphere of diameter R). Within the axis-aligned box, cluster j's backface culling probability $P_j$ is computed as the ratio of the volume enclosed by the culling volume to the eye point volume defined by axis-aligned box V. This probability is referred to as the near-field backface culling probability, because eye points are restricted to being relatively near to the cluster.

The geometric size of the culling volume is the sum of eight sub-volumes, one for each cluster octant—i.e., the octants defined about the cluster local origin b—in which a culling plane is defined. In each cluster octant, the culling sub-volume is the volume that is within box V, below the culling plane for cluster octant, and within that cluster octant.

Near field backface culling probabilities are affected by different choices of the local test coordinate system. As described above in the section on transformation of coordinates for testing, one preferably places the test coordinate system's origin in the vicinity of the cluster. Preferably, only a handful of origin candidates, such as the eight corners of the cluster's bounding box, and the centroid of the vertices of the cluster, need to be examined. The candidate with maximum near field probability is then accepted and used to perform the test.

The use of tristrips improves rendering performance over simply using the individual polygons. Some tristrips may be quite long—long enough, in fact, to have a backface culling probability of zero. In order to better perform backface culling, long tristrips can be broken into shorter ones, thereby increasing the backface culling probability of each piece. The fragments preferably should not, however, become so short that the benefits of tristripping are totally lost.

Given two clusters of A and B, it may become necessary to determine whether it is faster to render them separately, performing two cluster backface tests, or to render them as a single merged cluster, C, performing just one test? This is the driving condition used in the cluster forming algorithm.

Let T be the time it takes to perform one cluster backface test, $P_X$ the near field backface culling probability of a cluster X, and $C_X$ the time to render cluster X. The average time to test and render cluster X is $T+(1-P_X)C_X$. For two clusters A and B, a merged cluster C makes sense only if the following condition is satisfied: $T+(1-P_C)C_C<2T+(1-P_A)C_A+(1-P_B)C_B$.

Assuming the cost of rendering a single merged cluster equals the sum of the costs of its constituent clusters, $$(1-P_C)(C_A+C_B) < T + (1-P_A)C_A + (1-P_B)C_B \leftrightarrow \qquad (12)$$

$$P_C > \frac{P_A C_A + P_B C_B - T}{C_A + C_B}$$

The rendering cost $C_x$ can be determined by examining the tristrips contained in the cluster. Assuming a transfer/transform bound rendering pipeline, $C_x$ may be approximated by the rendering cost R of the vertex, times the number of vertices in the cluster. Assuming N and M vertices in clusters A and B, respectively, and substituting into (9) yields $$P_C > \frac{P_A N + P_B M - T/R}{N+M} \qquad (13a)$$

or $$P_C > \mu - \frac{T/R}{N+M} \qquad (13b)$$

where $\mu$ is a weighted average probability for culling the combined cluster and the term (T/R)/(N+M) is related to the incremental cost of culling two clusters, instead of one. In the general case, there is only one unknown quantity in Eqs. (13a) and (13b), the ratio T/R, which is the ratio of the time to perform one cluster backface test to the time to render one vertex. For a given machine configuration and vertex complexity, this ratio should be a measurable constant and valid no matter what geometry is being rendered. In this context, vertex complexity refers to the difference between models containing normals, textures, and/or colors. In each case, the time to render a vertex will be different, but T/R for that particular type of vertex will be constant.

In some cases it may be advantageous to break up an existing tristrip into two smaller tristrips. This happens where $P_c$ for the original tristrip is below some first predetermined threshold and the number of triangles in the original tristrip is larger than some second predetermined threshold. If these conditions are met, the original tristrip can be broken up into its individual triangles, and these may be used in the clustering algorithm.

Figure 3:
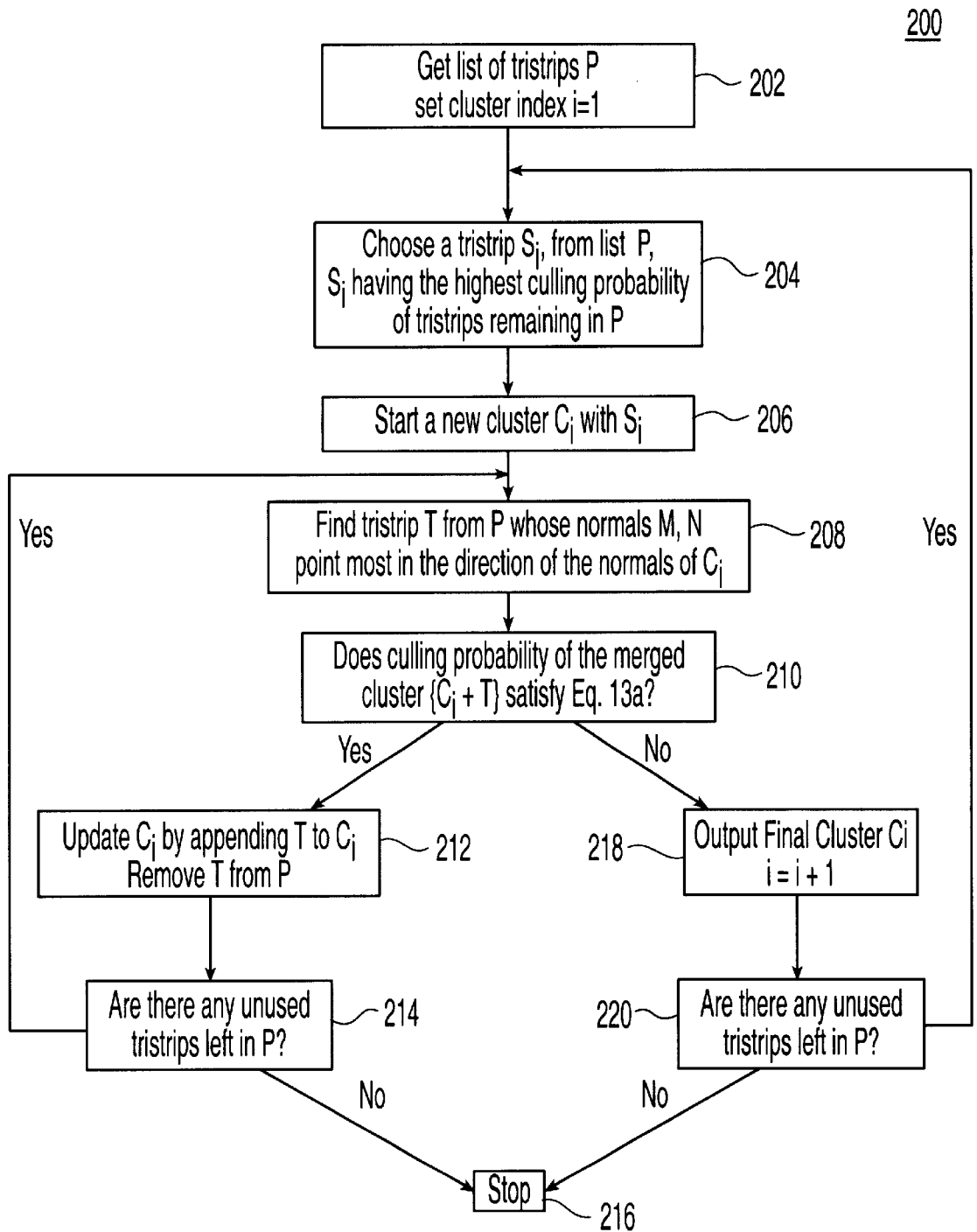
FIG. 3 shows a flowchart of the clustering algorithm in accordance with the present invention.

FIG. 3 presents a pseudo-code-type flow chart 200 of the cluster-forming algorithm. In the embodiment of FIG. 3, the algorithm's input is a set of tristrips and its output is a set of clusters to be used for rendering. Again, it should be kept in mind that the algorithm can operate on individual polygons, quadstrips, meshes and other groupings of planar surfaces. At step 202, a file or data structure comprising a pool P of the tristrips is retrieved from memory and a cluster index i is set to 1. It should be noted here that additional information needed (or calculated as needed) about each of the tristrips includes the normal vectors N and M for each tristrip (based on the normal components for its constituent triangles) and the probability of each tristrip being culled.

At step 204, an initial, or seed, tristrip $S_i$ is selected based on a predetermined criteria and at step 206, tristrip $S_i$ this forms the basis for a new cluster $C_i$. In a preferred embodiment, the tristrip having the largest backface culling probability is chosen to be the seed tristrip $S_i$ for cluster $C_i$. In general, the largest backface culling probability is associated with a tristrip having M and N vectors are that most similar. It should be noted, however, that other predetermined criteria that may be considered include the size of the tristrips (choosing, e.g., the tristrip with the smallest, the largest, or the median number of triangles or vertices), the principal orientation of the triangles within the tristrip (e.g., the tristrip having an average normal pointing closest to the (1,0,0) direction), or the length of the tristrip (e.g., the tristrip having the smallest, the largest or the median Euclidean distance between its vertices). One skilled in the art will readily understand that other criteria may also be used to select the initial, or seed, tristrip $S_i$.

Regardless of what criterion is used to decide upon tristrip $S_i$ to form the seed of new cluster $C_i$, in step 208, a second tristrip T is selected from the remaining members of the pool P of tristrips. Preferably, the criterion for selecting T is that the M and N normals corresponding to T (M and N being based on the triangles within T) point most in the direction of the corresponding normals of $C_i$. For this comparison, a similarity measure among two pairs of M and N is needed. In a preferred embodiment, the sum of the absolute value of the differences between the corresponding Ms and Ns is used as a similarity measure, and this works substantially as described below with reference to Eq. (14). Thus, given the cluster $C_i$ (initially comprising only seed tristrip $S_i$), one compares $M_{Ci}$ and $N_{Ci}$, with the corresponding values for all the other tristrips in P, and chooses that tristrip T having normals M and N most similar to those of cluster $C_i$.

At step 210, a determination is made to see whether the combined cluster of $C_i$ and T satisfies the inequality of Eq. (13a) (with $C_i$ representing cluster "A" and T representing cluster "B" in Eq. (13a)). If the inequality is satisfied, then control proceeds to step 212 where cluster $C_i$ is updated by appending T thereto and T is removed for pool P. Thereafter, control proceeds to step 214, where a test is done to see whether there are any tristrips left in P. If none are left, control proceeds to step 316, where the clustering process is stopped. If, on the other hand, unused tristrips remain in pool P, then control flows back to step 208 to identify a next tristrip T for appending to C.

If, at step 210, it is determined that the combined cluster of $C_i$ and T does not satisfy the inequality of Eq. (13a), then cluster $C_i$ is presumed to be finalized and control flows to step 218, where the cluster $C_i$ is output and the index i is incremented so as to prepare for forming the next cluster $C_i$. Control then flows to step 220 to determine whether there are any tristrips left in P. If none are left, control flows to step 216 where the process is stopped. If, on the other hand, it appears that unused tristrips remain, then control flows back to step 204, where a new seed tristrip $S_i$ is selected to form a new cluster $C_i$.

In the cluster formation methodology described above, once a cluster is formed, it is not revisited to determine whether it should be combined with other clusters. Thus, a variation of the cluster forming methodology might call for subsequent clusters to consider merging with previously formed clusters, in addition to simply having individual tristrips appended thereto.

Hierarchical Clustering

Furthermore, to save on culling time, the backface tests may be performed hierarchically. The various clusters may be set up in a hierarchy based on some predetermined parameter. For example, clusters having "similar" M and N vectors, may be placed within the hierarchy, with the cluster having the smallest d value dominating the remaining clusters. Then, if the backface culling test applied to the cluster having the smallest d value indicates that it is to be culled, all the clusters having "similar" M and N vectors may also be culled without explicitly applying the backface culling test to each cluster. An example of a similarity measure that may be used for to compare the M and N vectors of two clusters A and B is the sum of the absolute values of the differences between the individual M and N vectors:

$$|M_A - M_B| + |N_A - N_B| \leq \gamma \quad (14)$$

where $N_A$, $M_A$ and $N_B$, $M_B$ correspond to the M and N vectors of cluster A and cluster B, respectively, and γ is some predetermined threshold for the similarity measure, below which the two sets of vectors are said to the similar. It should be noted, however, that other metrics for similarity may also be used in forming a hierarchy for these purposes.

When such a hierarchy is structured, it may be expedient to utilize frontface culling tests in order to create symmetric culling behavior. Then, hierarchy traversal may be pruned at inner nodes for frontfacing as well as backfacing clusters. The derivation of a frontface test proceeds as described above for the backface test, only with all normals reversed. Thus, the frontface culling test corresponding to Eq. (8) is given by:

$$\mathrm{Comp}_e(-M, -N) \cdot e + \mathrm{Max}_i (n_i, p_i) \leq 0 \quad (15)$$

In such case, the only data that has to be stored in addition to that of a backface test is the scalar $e = \mathrm{Max}_i (n_i, p_i)$, which takes four additional bytes for single precision.

It should be evident from the foregoing discussion that the above-described invention is preferably implemented in software written in C++ on a general purpose computer connected to a graphics accelerator via a bus. It should also be evident that neither the selection of computer hardware, nor the selection of software language for implementing the present invention, is critical. However, the performance of the algorithms depend on the specific hardware selected.

Experimental Results

A number of experiments were undertaken to investigate the effect of clustered backface culling on graphics performance. Three different models, seen in FIGS. 4, 7, and 9, and described in Table 1 were investigated. "Average" values in the tables below were computed from 100 randomly selected viewpoints lying on a sphere about the model in question. The sphere radius was chosen so that the model fills the screen. All data was collected on a Hewlett-Packard C200 workstation provided with an FX/6 graphics accelerator. The presence of an extremely fast graphics accelerator, with respect to the speed of its host CPU, represents the most challenging situation in which to evaluate a backface culling algorithm.

TABLE 1

Test Models Used

| Model | Number of Polygons | Number of Tristrips | Average % Triangles Backfacing |
|---|---|---|---|
| Spherical Dome | 3726 | 438 | 55.7% |
| Fishing Reel | 3074 | 970 | 51.3% |
| Locking Ring | 2604 | 496 | 53.6% |

Each of the three models was tested with six values for the T/R ratio of cluster backface test time over vertex rendering time. This ratio controls the degree of clustering achieved by the clustering algorithm described above. Lower values of T/R tend to result in smaller and more numerous clusters. Higher values of T/R tend to result in larger and less numerous clusters. The ratio is varied in the experiments to illustrate that for a given hardware platform and vertex complexity, the best performance of the backface culling algorithm occurs at the same value of T/R regardless of the model being rendered.

Figure 4:
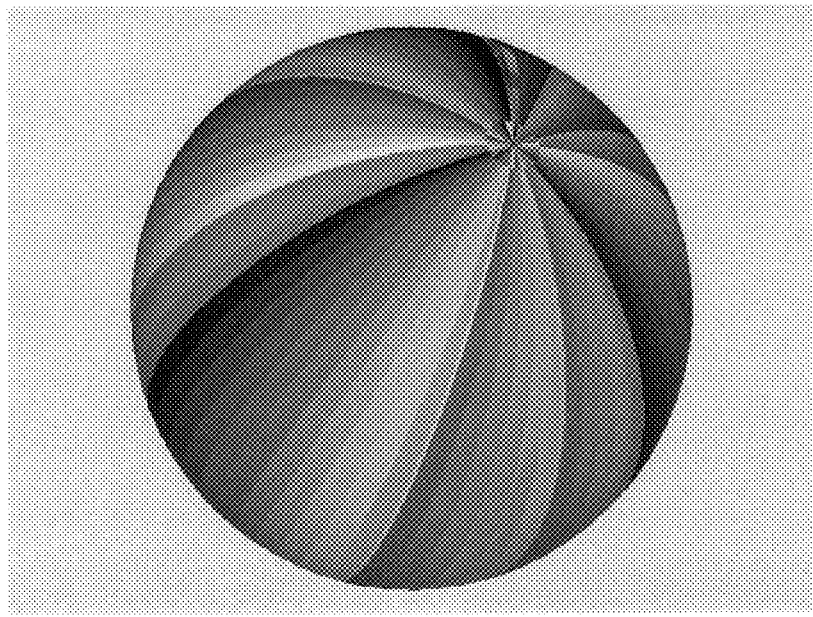
FIG. 4 shows a dome with colored tristrips.

Table 2 presents detailed performance and behavioral data for the spherical dome part. This part is simply a sphere, with a flat cut just below the equator. It is highly tristripped, and has a regular topology, as seen in FIG. 4. The uneven decrease in the number of clusters is due to the large average number of triangles per tristrip.

TABLE 2

Results on Spherical Dome

| T/R Ratio | Number of Clusters | Average Clusters Backfacing | Average Triangles Backfacing | Average Effectiveness | Average Speedup |
|---|---|---|---|---|---|
| 0.5 | 129 | 50.0% | 30.9% | 55.5% | 16% |
| 1.0 | 87 | 48.7% | 30.1% | 54.1% | 14% |
| 1.5 | 145 | 47.4% | 46.8% | 84.0% | 31% |
| 2.0 | 86 | 46.4% | 45.1% | 80.9% | 31% |
| 2.5 | 68 | 46.3% | 43.7% | 78.5% | 26% |
| 3.0 | 49 | 44.1% | 41.9% | 75.3% | 18% |

The fifth table column, Average Effectiveness, lists the average percentage of geometrically backfacing triangles culled by cluster backface tests. Two primary factors conspire to reduce the algorithm's effectiveness below 100%. One is the approximate nature of the cluster backface test upon multiple, non-coplanar tristrips. Another is the effect of clustering, making it necessary to render a whole cluster, even if there is only one triangle frontfacing.

The final table column, Average Speedup, lists the increase in rendering speed seen from the original tristripped model to the backface culled model. Notice that this column contains a peak value of 31% at intermediate values of T/R. Looking ahead at the results for the other models tested (Tables 3 and 4), we see in each case that there is a well-defined peak around T/R=1.0.

For lower values of T/R, the clustering algorithm forms more clusters. Each of these clusters represents a backface test that must be made while rendering the part. As more cluster backface tests are made, less time is spent actually rendering. Moreover, graphics accelerators perform better when multiple primitives can be rendered at once, and more small clusters mean more overhead in the rendering loop.

For larger values of T/R, the clustering algorithm forms fewer clusters, on more widely varying normals, reducing the near field backface culling probabilities. This leads to fewer successful cluster backface tests, and more actually backfacing triangles sent to the graphics accelerator.

Figure 5:
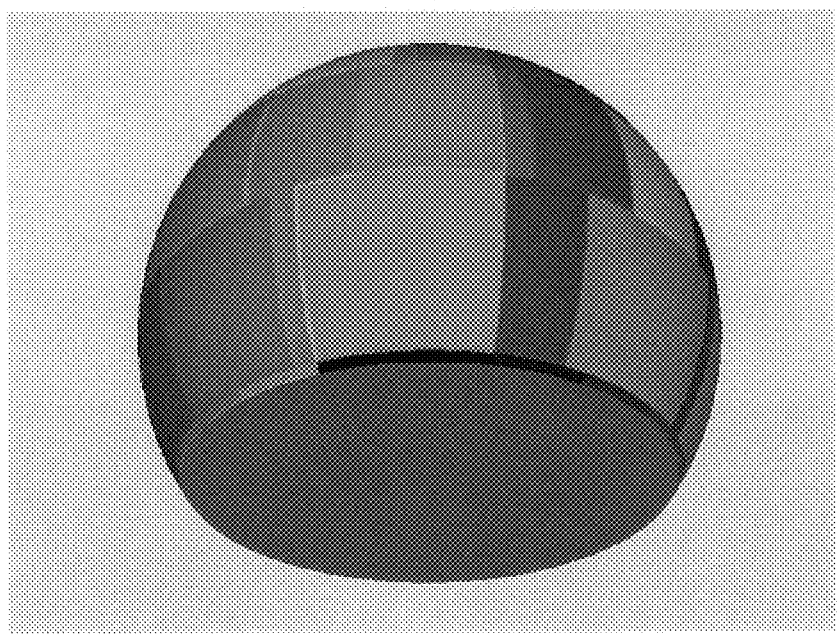
FIG. 5 shows the dome of FIG. 4 with colored clusters for T/R=1.5.

For the dome model, both effectiveness and speedup are at their peak values for T/R=1.5. Because this model is highly tristripped from the outset, it represents a very disadvantageous situation for the clustering algorithm. Even so, it realizes a 31% increase in rendering speed. FIG. 5 shows the spherical dome processed with T/R=1.5, and each cluster colored differently.

Figure 6:
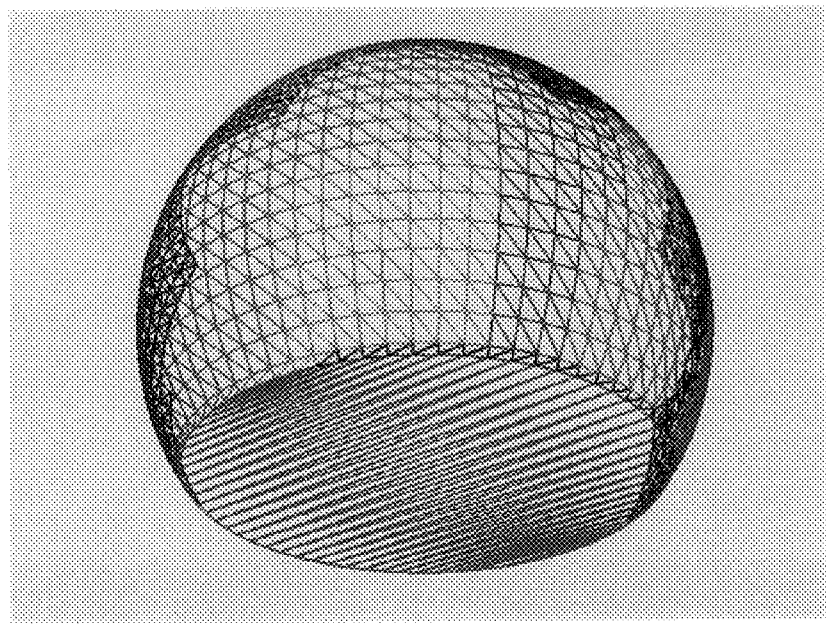
FIG. 6 shows the dome of FIG. 4 with colored lines.

FIG. 6 shows an example view of the dome in line rendering mode, to verify that backfacing clusters are indeed not being rendered. It is noted that, in FIG. 6, some clusters containing backfacing polygons near the silhouette are rendered.

Figure 7:
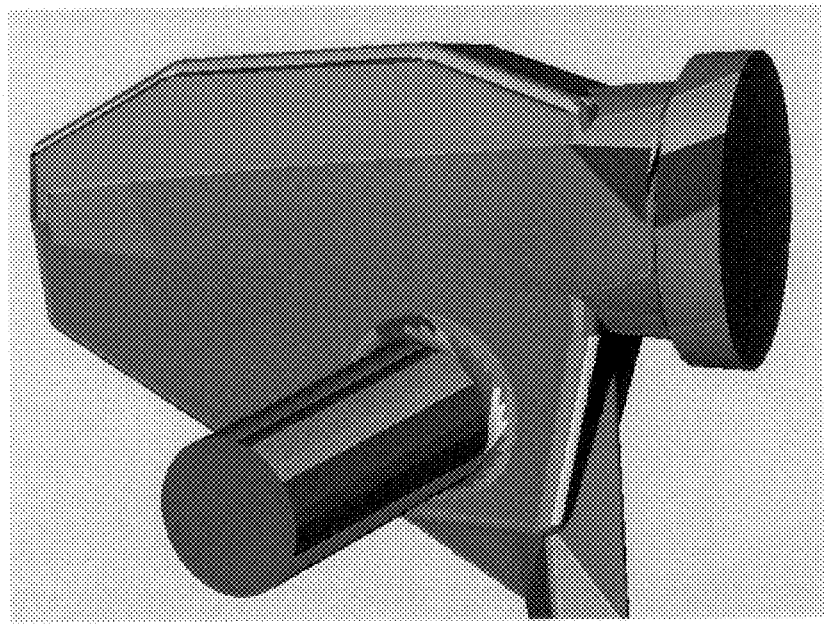
FIG. 7 shows a fishing reel with colored clusters for T/R=1.5.
Figure 8:
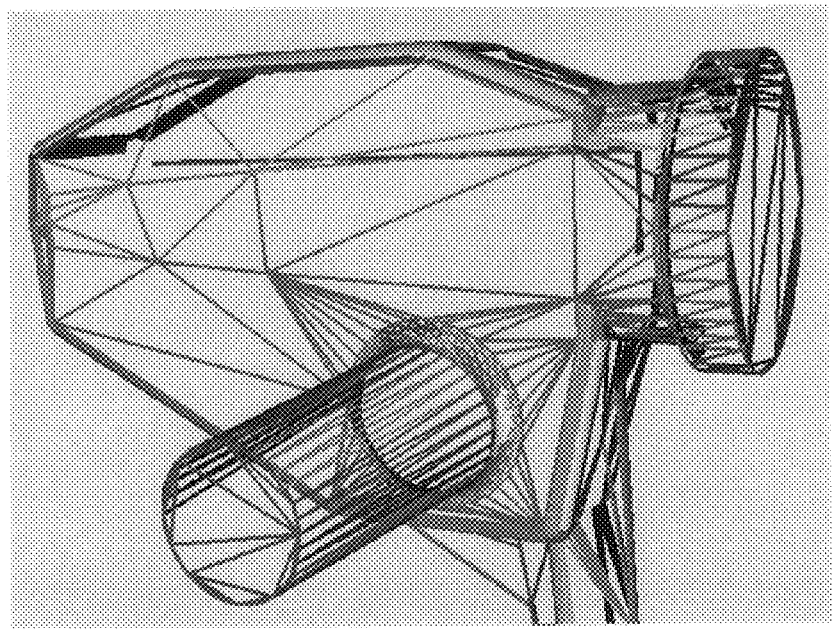
FIG. 8 shows the fishing reel of FIG. 7 rendered with lines.

Table 3 shows data for the fishing reel part. This part is more irregular in construction, with shorter average tristrips than the dome. Consequently, the clustering algorithm has more choices for forming clusters. The result is a smoothly decreasing number of clusters as T/R increases. For the fishing reel part, peak effectiveness and speedup come at T/R=1.0, with substantial 80% and 50%, respectively. FIG. 7 and 8 show the fishing reel with colored clusters, and lines.

TABLE 3

Results on Fishing Reel part

| T/R Ratio | Number of Clusters | Average Clusters Backfacing | Average Triangles Backfacing | Average Effectiveness | Average Speedup |
|---|---|---|---|---|---|
| 0.5 | 368 | 45.4% | 39.7% | 77.4% | 45% |
| 1.0 | 248 | 41.5% | 41.3% | 80.5% | 50% |
| 1.5 | 164 | 38.6% | 38.6% | 75.3% | 41% |
| 2.0 | 121 | 36.6% | 36.7% | 71.5% | 37% |
| 2.5 | 98 | 35.9% | 35.4% | 69.0% | 29% |
| 3.0 | 81 | 33.9% | 33.3% | 64.8% | 29% |

Figure 9:
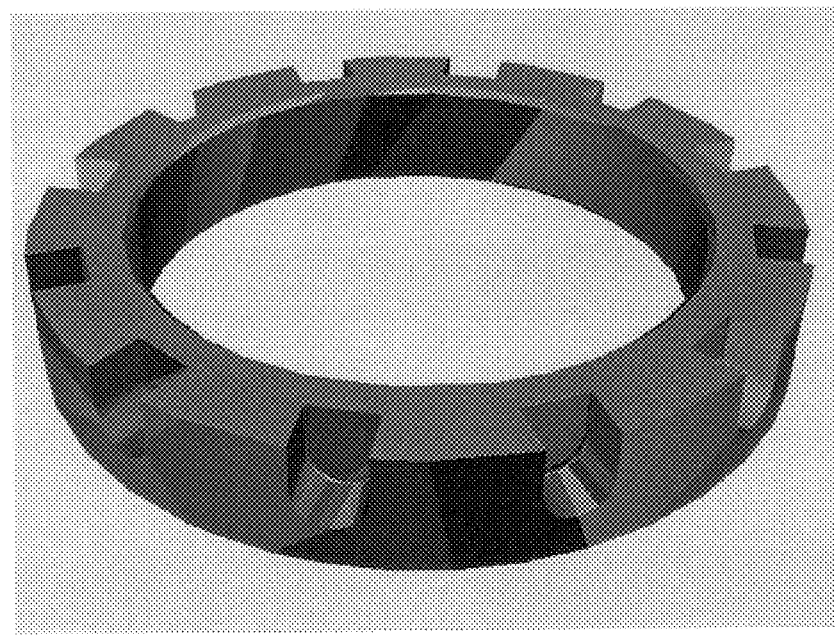
FIG. 9 shows a locking ring with colored clusters for T/R=1.5.
Figure 10:
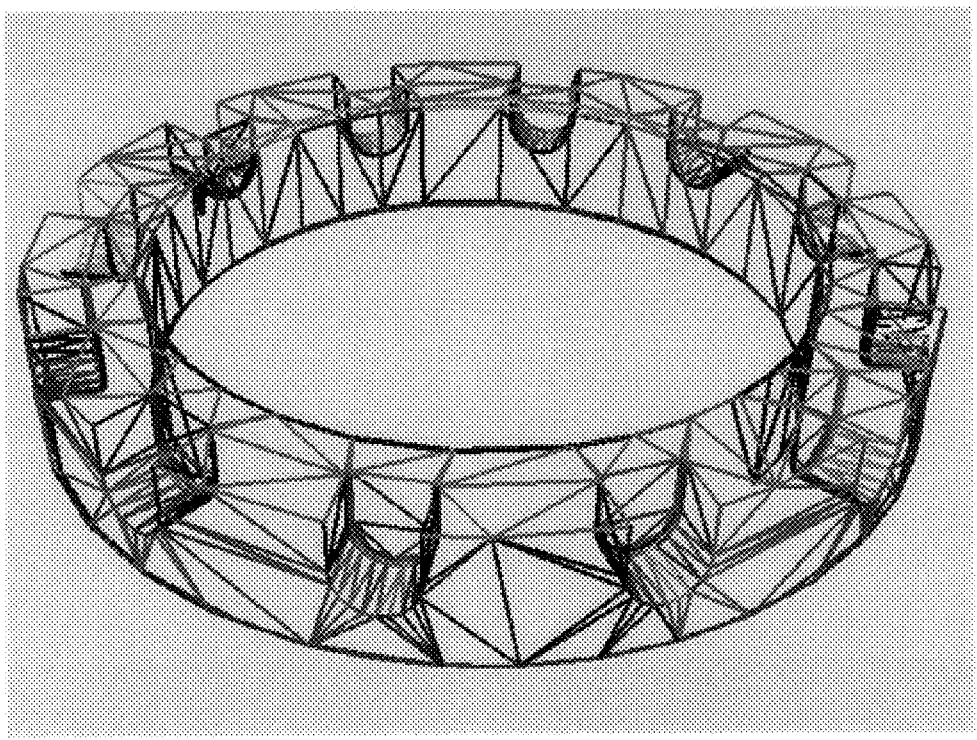
FIG. 10 shows the locking ring of FIG. 9 rendered with lines.

Table 4 shows data for the locking ring part—a roughly annular shape with several cuts along its perimeter. The data are strikingly similar in character to those found in Table 3. Again peak effectiveness and speedup comes at T/R=1.0. FIGS. 9 and 10 show the locking ring with colored clusters, and lines.

TABLE 4

Results on Locking Ring

| T/R Ratio | Number of Clusters | Average Clusters Backfacing | Average Triangles Backfacing | Average Effectiveness | Average Speedup |
|---|---|---|---|---|---|
| 0.5 | 156 | 47.7% | 26.0% | 48.5% | 35% |
| 1.0 | 211 | 42.4% | 41.5% | 77.5% | 47% |
| 1.5 | 157 | 40.6% | 40.6% | 75.8% | 43% |
| 2.0 | 115 | 38.5% | 38.7% | 72.2% | 36% |
| 2.5 | 93 | 36.6% | 35.8% | 66.8% | 31% |
| 3.0 | 76 | 34.4% | 34.5% | 64.4% | 29% |

For the two mechanical parts, peak effectiveness and speedups coincide for the same value of T/R=1.0. On the other hand, the Dome model has very long tristrips that must be broken down in order to form clusters, and so behaves differently than the two less regular models.

While the above invention has been described with reference to certain preferred embodiments and demonstrated with respect to particular experiments, it should be kept in mind that the scope of the present invention is not limited to these. Thus, one skilled in the art may find variations of these preferred embodiments which, nevertheless, fall within the spirit of the present invention, whose scope is defined by the claims set forth below.

What is claimed is:

1. A method of selecting that portion of a graphical object to be displayed, the graphical object comprising a first plurality of polygonal surfaces, the method comprising:

a step of clustering the first plurality of polygonal surfaces into a second plurality of clusters based on at least one measure of a backface culling probability of each of said second plurality of clusters; and a step of backface culling the clusters using a backface culling test, to eliminate portions of the graphical object which are not displayed.

2. The method according to claim 1, wherein two clusters A and B are merged in said clustering step if:

$$P_C > \frac{P_A N + P_B M - T/R}{N + M}$$

wherein:

$P_c$ is the near field backface culling probability of a cluster C formed by merging clusters A and B;

$P_A$ is the near field backface culling probability of cluster A;

$P_B$ is the near field backface culling probability of cluster B;

N is the number of vertices in cluster A;

M is the number of vertices in cluster B; and

T/R is the ratio of the time to perform one cluster backface test to the time to render one vertex.

3. The method according to claim 1, wherein the backface culling test to determine whether a particular cluster j is to be culled, comprises determining whether $$\text{Comp}_e(N, M) \cdot e - d \leq 0;$$

where:

e is an eye point, given as $e=[e^x, e^y, e^z]^T$ in world coordinates (x, y, z);

$\text{Comp}_e$ is a component-wise function, defined in vector notation for $c \in \{x, y, z\}$, as $\text{Comp}_e(a,b)^c = \{a^c \text{ for } e^c \leq 0, b^c \text{ for } e^c > \}$;

$d = \text{Min}_i(n_i \cdot p_i)$ is a minimum plane offset given as a dot product of a plane with normal n and a vertex point p, both n and p defined in world coordinates and i is the index of a polygonal surface within cluster j;

$N = [\text{Min}_i (n_i^x), \text{Min}_i (n_i^y), \text{Min}_i (n_i^z)]^T$; and $M = [\text{Max}_i (n_i^x), \text{Max}_i (n_i^y), \text{Max}_i (n_i^z)]^T$.

4. The method according to claim 1, wherein the polygonal surfaces are triangles.

5. The method according to claim 4, wherein the triangles are arranged into at least one of tristrips and trifans.

6. The method according to claim 1, wherein the measure of the backface culling probability of a cluster j is the ratio of a culling volume for that cluster, to a volume of space within which eye points for viewing the graphical object are assumed to lie.

7. The method according to claim 6, wherein said volume of space is defined by a cube having sides of length R=rS, with r>1 and S being the length of the main diagonal of a bounding box of the graphical object.

8. The method according to claim 6, wherein said volume of space is defined by a sphere having a diameter of length R=rS, with r>1 and S being the length of the main diagonal of a bounding box of the graphical object.

9. The method according to claim 6, wherein a culling region for a cluster j, for which the culling volume is defined, is bounded by at least one culling plane for each of a plurality of octants formed about a local origin of cluster j.

10. The method according to claim 9, wherein each of the culling planes bounding cluster j is defined by parameters d, M and N, wherein $d = \text{Min}_i(n_i \cdot p_i)$ is a minimum plane offset given as a dot product of a plane with normal n and a vertex point p, both n and p defined in world coordinates and i is the index of a polygonal surface within cluster j;

$N = [\text{Min}_i (n_i^x), \text{Min}_i (n_i^y), \text{Min}_i (n_i^z)]^T$; and $M = [\text{Max}_i (n_i^x), \text{Max}_i (n_i^y), \text{Max}_i (n_i^z)]^T$.

11. A method of establishing a culling volume for a cluster of polygonal surfaces belonging to a graphical object; the method comprising:

a step of establishing at least one culling plane for each of a plurality of octants formed about a local origin of the cluster.

12. The method according to claim 11, wherein the at least one culling plane is defined by parameters d, M and N, wherein $d = \text{Min}_i(n_i \cdot p_i)$ is a minimum plane offset given as a dot product of a plane with normal n and a vertex point p, both n and p defined in world coordinates and i is the index of a polygonal surface within the cluster;

$N = [\text{Min}_i (n_i^x), \text{Min}_i (n_i^y), \text{Min}_i (n_i^z)]^T$; and $M = [\text{Max}_i (n_i^x), \text{Max}_i (n_i^y), \text{Max}_i (n_i^z)]^T$.

13. The method according to claim 1, wherein the backface culling test to determine whether a particular cluster j is to be culled, comprises determining whether $$\text{Comp}_e(N, M) \cdot (e-b) - d \leq 0;$$

where:

e is an eye point, given as $e=[e^x, e^y, e^z]^T$ in world coordinates (x, y, z);

b is cluster local origin;

$\text{Comp}_e$ is a component-wise function, defined in vector notation for $c \in \{x, y, z\}$, as $\text{Comp}_e(a,b)^c = \{a^c \text{ for } e^c \leq 0, b^c \text{ for } e^c > 0\}$;

$d = \text{Min}_i(n_i \cdot (p_i - b))$ is a minimum plane offset given as a dot product of a plane with normal n and a vertex point p, both n and p defined in world coordinates, and i is the index of a polygonal surface within the cluster;

$N = [\text{Min}_i (n_i^x), \text{Min}_i (n_i^y), \text{Min}_i (n_i^z)]^T$; and $M = [\text{Max}_i (n_i^x), \text{Max}_i (n_i^y), \text{Max}_i (n_i^z)]^T$.

14. A method for processing a graphical object in preparation for display, the graphical object being represented by a plurality of clusters, each cluster comprising at least one polygonal surface, the method comprising:

for each cluster, computing N, M and d, where:

$d = \text{Min}_i(n_i \cdot p_i)$ is a minimum plane offset given as a dot product of a plane with normal n and a vertex point p, both n and p defined in world coordinates and i is the index of a polygonal surface within said cluster;

$N = [\text{Min}_i (n_i^x), \text{Min}_i (n_i^y), \text{Min}_i (n_i^z)]^T$; and $M = [\text{Max}_i (n_i^x), \text{Max}_i (n_i^y), \text{Max}_i (n_i^z)]^T$.

15. The method according to claim 14, further comprising:

for each cluster, computing a cluster local origin b.

16. The method according to claim 14, wherein the at least one polygonal surface comprises a plurality of triangles arranged as at least one of tristrips and trifans.

17. The method according to claim 14, further comprising:

organizing said plurality of clusters into a hierarchy.

18. The method according to claim 17, wherein clusters having similar N and M vectors are placed together within the hierarchy.

19. The method according to claim 18, wherein two clusters A and B are placed together within the hierarchy if $$|M_A - M_B| + |N_A - N_B| \leq \gamma,$$

where $N_A$, $M_A$ and $N_B$, $M_B$ correspond to the M and N vectors of cluster A and cluster B, respectively, and $\gamma$ is a predetermined threshold.

20. A method for processing a graphical object in preparation for display, the graphical object comprising a first plurality of clusters including at least a first cluster A and a second cluster B, each of said clusters comprising at least one polygonal surface; the method comprising:

merging clusters A and B into a new cluster C if a near field backface culling probability of cluster C exceeds a value that is a function of at least:

near field backface culling probabilities of individual clusters A and B; and the time it takes to perform at least one cluster backface test.

21. The method according to claim 20, wherein said value is also a function of:
the time it takes to render members of cluster A; and
the time it takes to render members of cluster B.

22. The method according to claim 20, wherein said value is also a function of:
the number of vertices in each of clusters A and B, and
the cost of rendering a single vertex.

23. The method according to claim 20, wherein the polygonal surfaces are triangular surfaces arranged as at least one of tristrips and trifans.

24. The method according to claim 20, wherein the near field backface culling probability of a cluster is the ratio of a culling volume for that cluster, to a volume of space within which eye points for viewing the graphical object are assumed to lie.

25. The method according to claim 24, wherein said volume of space is defined by a cube having sides of length R=rS, with r>1 and S being the length of the main diagonal of a bounding box of the graphical object.

26. The method according to claim 24, wherein said volume of space is defined by a sphere having a diameter of length R=rS, with r>1 and S being the length of the main diagonal of a bounding box of the graphical object.

27. The method according to claim 24, wherein a culling region for a cluster for which the culling volume is defined, is bounded by at least one culling plane for each of a plurality of octants formed about a local origin of that cluster.

28. The method according to claim 27, wherein each of the culling planes bounding said cluster is defined by parameters d, N and M, wherein
d≡$Min_i(n_i \cdot p_i)$ is a minimum plane offset given as a dot product of a plane with normal n and a vertex point p, both n and p defined in world coordinates and i is the index of a polygonal surface within said cluster;
N≡$[Min_i (n_i^x), Min_i (n_i^y), Min_i (n_i^z)]^T$; and
M≡$[Max_i (n_i^x), Max_i (n_i^y), Max_i (n_i^z)]^T$.

29. A method of displaying a graphical object comprising a first plurality of polygonal surfaces, the method comprising:
prior to rendering and without reference to a particular eye point, arranging the first plurality of polygonal surfaces into a second plurality of clusters based on at least one measure of a backface culling probability of each of said second plurality of clusters; and
during rendering and with reference to particular eye point, backface culling the second plurality clusters using a backface culling test, to eliminate portions of the graphical object which are not displayed.

30. The method according to claim 29, wherein said arranging step merges clusters A and B into a single cluster C if:
a near field backface culling probability of cluster C exceeds a value that is a function of at least:
near field backface culling probabilities of individual clusters A and B; and
the time it takes to perform at least one cluster backface test.

31. The method according to claim 29, wherein said value is also a function of:
the time it takes to render members of cluster A; and
the time it takes to render members of cluster B.

32. The method according to claim 29, wherein said value is also a function of:
the number of vertices in each of clusters A and B, and
the cost of rendering a single vertex.

33. The method according to claim 29, wherein said arranging step merges clusters A and B into a single cluster C if:

$$P_C > \frac{P_A N + P_B M - T/R}{N + M}$$

wherein:
$P_C$ is the near field backface culling probability of a cluster C formed by merging clusters A and B;
$P_A$ is the near field backface culling probability of cluster A;
$P_B$ is the near field backface culling probability of cluster B;
N is the number of vertices in cluster A;
M is the number of vertices in cluster B; and
T/R is the ratio of the time to perform one cluster backface test to the time to render one vertex.

34. The method according to claim 29, wherein the backface culling test to determine whether a particular cluster j is to be culled, comprises determining whether $Comp_e (N, M) \cdot e - d \leq 0$;

where:
e is an eye point, given as e=$[e^x, e^y, e^z]^T$ in world coordinates (x, y, z);
$Comp_e$ is a component-wise function, defined in vector notation for c ∈{x, y, z}, as $Comp_e (a,b)^c \equiv \{a^c$ for $e^c \leq 0$, $b^c$ for $e^c > 0\}$;
d≡$Min_i(n_i \cdot p_i)$ is a minimum plane offset given as a dot product of a plane with normal n and a vertex point p, both n and p defined in world coordinates and i is the index of a polygonal surface within cluster j;
N≡$[Min_i (n_i^x), Min_i (n_i^y), Min_i (n_i^z)]^T$; and
M≡$[Max_i (n_i^x), Max_i (n_i^y), Max_i (n_i^z)]^T$.

35. The method according to claim 29, wherein the backface culling test to determine whether a particular cluster j is to be culled, comprises determining whether $Comp_e (N, M) \cdot (e-b) - d \leq 0$;

where:
e is an eye point, given as e=$[e^x, e^y, e^z]^T$ in world coordinates (x, y, z);
b is cluster local origin;
$Comp_e$ is a component-wise function, defined in vector notation for c ∈{x, y, z}, as $Comp_e (a,b)^c \equiv \{a^c$ for $e^c \leq 0$, $b^c$ for $e^c > 0\}$;
d≡$Min_i(n_i \cdot (p_i - b))$ is a minimum plane offset given as a dot product of a plane with normal n and a vertex point p, both n and p defined in world coordinates, and i is the index of a polygonal surface within the cluster;
N≡$[Min_i (n_i^x), Min_i (n_i^y), Min_i (n_i^z)]^T$; and
M≡$[Max_i (n_i^x), Max_i (n_i^y), Max_i (n_i^z)]^T$.

36. The method according to claim 29, wherein said first plurality of polygonal surfaces comprises a plurality of triangles arranged as at least one of tristrips and trifans.

37. The method according to claim 29, wherein the near field backface culling probability of a cluster is the ratio of a culling volume for that cluster, to a volume of space within which eye points for viewing the graphical object are assumed to lie.

38. The method according to claim 37, wherein said volume of space is defined by a cube having sides of length R=rS, with r>1 and S being the length of the main diagonal of a bounding box of the graphical object.

39. The method according to claim 37, wherein said volume of space is defined by a sphere having a diameter of length R=rS, with r>1 and S being the length of the main diagonal of a bounding box of the graphical object.

40. The method according to claim 37, wherein a culling region for a cluster for which the culling volume is defined, is bounded by at least one culling plane for each of a plurality of octants formed about a local origin of that cluster.

41. The method according to claim 40, wherein each of the culling planes bounding said cluster is defined by parameters d, N and M, wherein $d = \text{Min}_i(n_i \cdot p_i)$ is a minimum plane offset given as a dot product of a plane with normal n and a vertex point p, both n and p defined in world coordinates and i is the index of a polygonal surface within said cluster;

$N = [\text{Min}_i\ (n_i^x),\ \text{Min}_i\ (n_i^y),\ \text{Min}_i\ (n_i^z)]^T$; and $M = [\text{Max}_i\ (n_i^x),\ \text{Max}_i\ (n_i^y),\ \text{Max}_i\ (n_i^z)]^T$.

42. A method for displaying a graphical object represented by a plurality of clusters, each cluster comprising at least one polygonal surface, the method comprising:

rendering clusters other than those for which $\text{Comp}_e\ (N, M) \cdot e - d \leq 0$;

where:

e is an eye point, given as $e = [e^x,\ e^y,\ e^z]^T$ in world coordinates (x, y, z);

$\text{Comp}_e$ is a component-wise function, defined in vector notation for $c \in \{x, y, z\}$, as $\text{Comp}_e\ (a,b)^c = \{a^c$ for $e^c \leq 0,\ b^c$ for $e^c > 0\}$;

$d = \text{Min}_i(n_i \cdot p_i)$ is a minimum plane offset given as a dot product of a plane with normal n and a vertex point p, both n and p defined in world coordinates, and i is the index of a polygonal surface within the cluster;

$N = [\text{Min}_i\ (n_i^x),\ \text{Min}_i\ (n_i^y),\ \text{Min}_i\ (n_i^z)]^T$; and $M = [\text{Max}_i\ (n_i^x),\ \text{Max}_i\ (n_i^y),\ \text{Max}_i\ (n_i^z)]^T$.

43. The method according to claim 42, wherein the at least one polygonal surface comprises a plurality of triangles arranged as at least one of tristrips and trifans.

44. The method according to claim 42, comprising:

organizing said plurality of clusters into a hierarchy, prior to rendering any clusters.

45. The method according to claim 44, wherein clusters having similar N and M vectors are placed together within the hierarchy.

46. The method according to claim 45, wherein two clusters A and B are placed together within the hierarchy if $|M_A - M_B| + |N_A - N_B| \leq \gamma$, where $N_A$, $M_A$ and $N_B$, $M_B$ correspond to the M and N vectors of cluster A and cluster B, respectively, and $\gamma$ is a predetermined threshold.

47. The method according to claim 44, comprising:

for the cluster having the smallest d value among clusters that have been placed together within the hierarchy, determining whether $\text{Comp}_e\ (N, M) \cdot e - d \leq 0$;

if $\text{Comp}_e\ (N, M) \cdot e - d \leq 0$ for the cluster having the smallest d value, rendering none of the clusters that have been placed together within the hierarchy, with said cluster having the smallest d value.

48. A method for displaying a graphical object represented by a plurality of clusters, each cluster comprising at least one polygonal surface, the method comprising:

rendering clusters other than those for which $\text{Comp}_e\ (N, M) \cdot (e-b) - d \leq 0$;

where:

e is an eye point, given as $e = [e^x,\ e^y,\ e^z]^T$ in world coordinates (x, y, z);

b is cluster local origin;

$\text{Comp}_e$ is a component-wise function, defined in vector notation for $c \in \{x, y, z\}$, as $\text{Comp}_e\ (a,b)^c = \{a^c$ for $e^c \leq 0,\ b^c$ for $e^c > 0\}$;

$d = \text{Min}_i(n_i \cdot (p_i - b))$ is a minimum plane offset given as a dot product of a plane with normal n and a vertex point p, both n and p defined in world coordinates, and i is the index of a polygonal surface within the cluster;

$N = [\text{Min}_i\ (n_i^x),\ \text{Min}_i\ (n_i^y),\ \text{Min}_i\ (n_i^z)]^T$; and $M = [\text{Max}_i\ (n_i^x),\ \text{Max}_i\ (n_i^y),\ \text{Max}_i\ (n_i^z)]^T$.

49. The method according to claim 48, wherein the at least one polygonal surface comprises a plurality of triangles arranged as at least one of tristrips and trifans.

50. The method according to claim 49, comprising:

organizing said plurality of clusters into a hierarchy, prior to rendering any clusters.

51. The method according to claim 50, wherein clusters having similar N and M vectors are placed together within the hierarchy.

52. The method according to claim 51, wherein two clusters A and B are placed together within the hierarchy if $|M_A - M_B| + |N_A - N_B| \leq \gamma$, where $N_A$, $M_A$ and $N_B$, $M_B$ correspond to the M and N vectors of cluster A and cluster B, respectively, and $\gamma$ is a predetermined threshold.

53. The method according to claim 50, comprising:

for the cluster having the smallest d value among clusters that have been placed together within the hierarchy, determining whether $\text{Comp}_e\ (N, M) \cdot (e-b) - d \leq 0$;

if $\text{Comp}_e\ (N, M) \cdot (e-b) - d \leq 0$ for the cluster having the smallest d value, rendering none of the clusters that have been placed together within the hierarchy, with said cluster having the smallest d value.

* * * * *